July 30, 1929.  M. P. DEMING  1,722,324
MEANS FOR MAKING PIPE JOINTS
Filed April 18, 1928  2 Sheets-Sheet 1
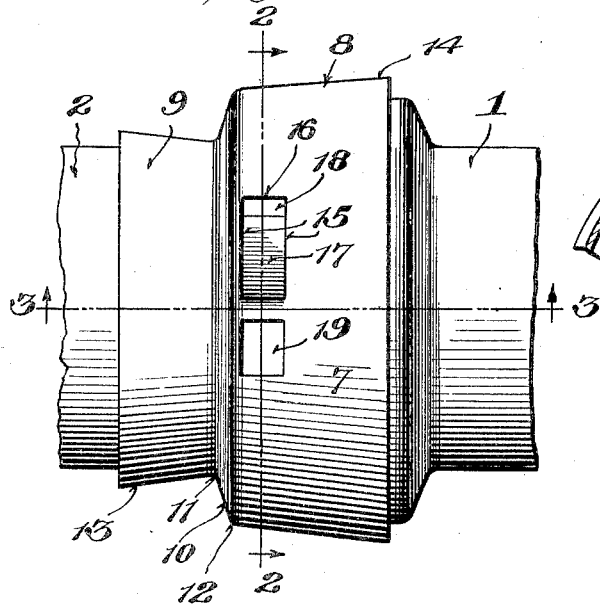
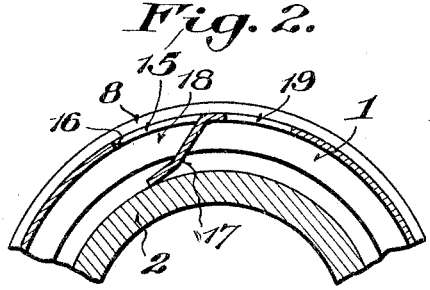
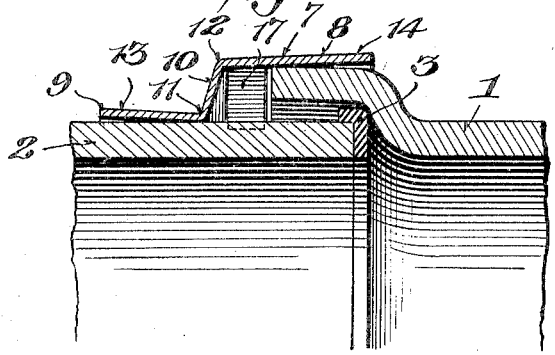
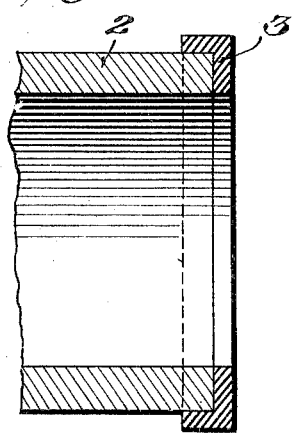
Martin P. Deming Inventor July 30, 1929.  M. P. DEMING  1,722,324

MEANS FOR MAKING PIPE JOINTS

Filed April 18, 1928  2 Sheets-Sheet 2

Martin P. Deming, Inventor

Patented July 30, 1929.

1,722,324

UNITED STATES PATENT OFFICE.

MARTIN P. DEMING, OF PASADENA, CALIFORNIA.

MEANS FOR MAKING PIPE JOINTS.

Application filed April 18, 1928. Serial No. 270,990.

My invention relates to pipe joints and has for object to provide means for making a sealed joint between adjacent lengths or sections of pipe in a quick and ready manner. The pipes to which my invention relates are such as are generally used for conduits for water, sewage, drainage, or other liquids, including tar or oil or the like, and are frequently laid in trenches or under ground, but may be laid above ground, or carried on suitable supports. Such pipes may be made of any suitable material or composition, such as earthenware, stoneware, vitrified clay, concrete, or reinforced concrete or other composition. Such pipes are made in convenient lengths or sections, each section being enlarged at one end to form what is generally known as the "bell"; the other end of the section being generally known as the "spigot". In joining the sections the spigot of one section is inserted within the bell of the next section and the space within the bell and surrounding the spigot therein is filled with a sealing material. Heretofore delays and difficulties have occurred in suitably supporting the sections in centered or axial alinement preparatory to sealing the joint, and also to forming a tight and homogeneous seal, owing to earth or foreign matter getting into the sealing space and forming a defect in the seal, or air or vapor from hot or molten sealing material becomes caught or occluded in the seal forming defects or porosities therein. Also various mechanical devices have been employed either to close the sealing space, or to support the pipe sections, which are more or less complex in construction or in their mode of adjustment or use, and consume time to secure in position. My invention has for its object to obviate objections of the character mentioned, and to provide a simple and efficient means for supporting the pipe sections in proper relation for forming the joint and at the same time closing the sealing space and directing the sealing material to obtain a tight and uniform seal in the sealing space and around the spigot.

Figure 5:
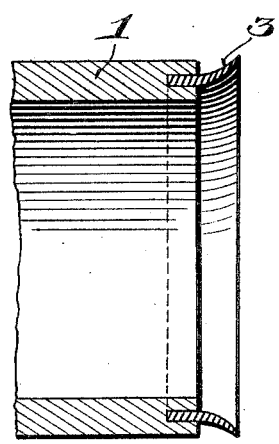
Figure 6:
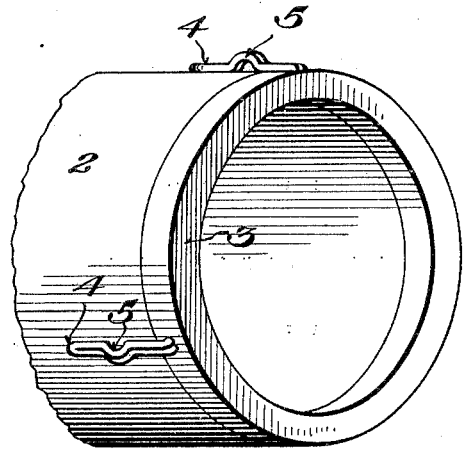
Figure 7:
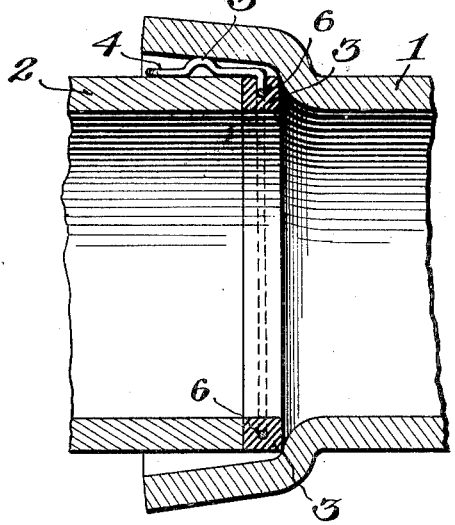
Figure 8:
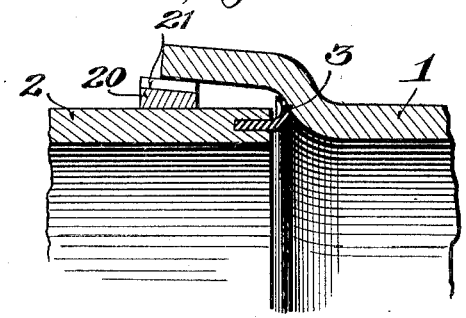

In the accompanying drawing I have illustrated the various features of my invention, it being understood that the forms shown are illustrative and not restrictive. Figure 1 is a plan view showing the joint sleeve or enevelope about the two ends of adjacent pipe sections in position for making the seal; Figure 2 is a fragmentary cross section on line 2—2, Fig. 1; Figure 3 is a similar longitudinal section on line 3—3 of Fig. 1; Figure 4 is a detail view of one form of packing ring or gasket; Figure 5 is a similar view of a modified form of packing or gasket; Figure 6 is a view showing one form of packing with retaining and centering means; Figure 7 is a sectional view of Fig. 6; Figure 8 is a form of packing or gasket for use at the mouth of the bell.

The enlarged end or bell of one pipe section is indicated at 1, Figs. 1 and 2, and the spigot end of the adjacent pipe section is indicated at 2. As shown the two pipe sections are shown in position for making or sealing the joint, with the spigot 2 inserted in the bell 1. In order to prevent fluid sealing material from escaping from the sealing space in the bell into the interior of the pipe, I provide an end packing or gasket 3 on and about the end of the spigot where the same abuts against the shoulder of the bell. This packing or gasket may be of any suitable compressible or elastic material, such as papier mâché or pulp, rubber, or composition, or other suitable packing material. In the form shown said gasket is in the form of a flanged ring, the flange portion of which overlaps and surrounds a portion of the cylindrical surface of the spigot, and serves to hold the gasket on the end of the spigot while the same is being inserted in the bell. Also said flange portion assists in centering the spigot in the bell, preventing lateral displacement. Another form of packing or gasket for the end of the spigot is shown in Fig. 5, this being of tapered form and seated in the end face of the spigot. This tapered form of gasket by its flexibility readily adapts itself to the shoulder of the bell to form a tight packing. In Figures 6 and 7 a form of packing or gasket is shown covering the end face of the spigot, and held in place thereon by metal or wire clips 4 that grasp between them the end of the spigot. Said wire or metal clips may be of any desired number and spaced apart circumferentially at desired intervals, according to the size of the pipe. A bend or hump 5 is formed in said clips, which makes contact with the interior of the bell and acts to center the spigot therein. To form said clips and secure them to the gasket a ring of wire 6 may be embedded in the gasket, the wire being bent at intervals to form the clips 4, and the clip portions bent outwardly to form the humps 5. It will be understood that the elasticity of the wire or metal retains the gasket on the spigot, and the friction between the humps and the inner surface of the bell acts to seat the gasket firmly on the end of the spigot as it is pushed into the bell.

To support the spigot and hold the same in axial alinement with the adjacent pipe section, and at the same time to close the sealing space at the mouth of the bell, I provide the sleeve or envelope 7. This envelope or sleeve is substantially bell-shaped, being formed with an enlarged portion 8 at one end, the other end 9 being of less diameter. The intermediate portion of said envelope at 10 forms a shoulder uniting said end portions. The larger end 8 of said envelope surrounds and embraces the bell 1 of one pipe section, and the narrower portion 9 of said sleeve surrounds and embraces the spigot end of the adjacent pipe section. The end portions 8 and 9 of said envelope preferably taper outwardly from the angles 11 and 12 respectively formed with the shoulder portion 10. Since pipes of a given rated size vary slightly in diameter of both bell and spigot, the internal diameter of the sleeve or envelope at the angles 11 and 12 is made as small as the smallest permissible diameters of spigot and bell of pipe of the rated size, so that the sleeves or envelopes made for a given size of pipe will closely embrace the spigot and bell, at the lines or angles 11 and 12, of the smallest permissible, or smallest tolerable, pipe of that size. The tapering or flaring of the envelope outwardly from the angles 11 and 12 is indicated at 13 and 14. The tapering form of the ends of the sleeve or envelope, as well as the elasticity of the material of which it is made, will preserve a closely fitting constriction or joint of the envelope around the spigot and bell at lines 11 and 12 for all tolerable or permissible variations in size of these parts in a given rated size of pipe. As will be apparent, when a spigot of one pipe section is inserted in place in the bell of its adjacent pipe section with the envelope 7 in position, the latter will inclose the mouth of the bell and the sealing space within the bell and around the inserted end of the spigot, thus forming a closed mold for the sealing material.

For the introduction of the sealing material within the said sealing space, I provide means in the envelope whereby the sealing material may be inserted through the same, either by pouring or pumping or in any suitable manner according to the nature and character of the sealing material. Such means include either cutting, or partially cutting or weakening the material of the envelope so as to form an opening therethrough. Preferably such opening is placed near the angle 12 and in or mainly in the bell portion of the envelope where it will clear the edge of the bell of the pipe within. Such opening is preferably formed by making two parallel incisions or scores, 15, in the envelope, extending in a circumferential direction. These incisions are joined at one end by a cross incision 16, so that the portion of the envelope bounded by said incisions may be readily pushed inwardly, forming a tongue 17, one end of which remains fast to the envelope. The opening 18 is thus formed in the envelope, constituting a gate or aperture through which sealing material may be introduced within the sealing space between the spigot and bell of adjacent pipe sections, while leading from said opening is the tongue 17 forming a guide or deflector for the sealing material causing it to flow in one direction only around the spigot and sealing space. In close proximity to said gate opening 18, I provide another opening gate opening 19, which may be formed in a manner similar to that for forming opening 18, that is by incising or weakening the material of the envelope about the area to be occupied by said opening, so that a suitable portion of the envelope may be readily torn out or otherwise bent aside or removed to form said opening 19. Said opening 19 is provided for a window or sight opening through which the sealing may be inspected as the sealing material is being introduced. As the sealing material is being introduced through gate opening 18, it will be deflected away from sight opening 19, flow around the sealing space, and rise to the level of sight opening 19, thus filling the sealing space and completely surrounding the spigot. This opening thus enables the workman to see when the sealing space is filled and when to cut off the inflow of sealing material. Opening 19 also serves another important purpose in providing a vent or escape for the air in said sealing space, or of vapor or gases from molten or hot sealing material. It has been found that defective seals result from air or vapor becoming entrapped or occluded in the sealing material which form cells or pores in the seal when the latter has solidified, such cells or pores in the seal forming or giving rise to leakage. By the provision of the vent opening 19, the air or other gas in the sealing space is driven out of the sealing space as the sealing material enters and without being entrapped by the latter, and the flow of the sealing material is not checked or interrupted. The opening 18 for the introduction of the sealing material may be in the bell portion of the envelope as shown, or partly in said bell portion and partly in shoulder portion 10, or wholly in shoulder portion 10, as desired. Obviously openings 18 and 19 need not be made, nor the envelope weakened therefor at the time the envelope is manufactured, since the workman may make such openings at the time of making the joint. The envelope or sleeve may be made of suitable paper, or paper board, pasteboard, corrugated board, asbestos paper or board, or paper containing asbestos, or made heat resisting for use with hot or molten sealing material, or such envelopes may be made of sheet metal, and may be formed in any suitable and convenient manner, as by pressing in a die or mold, or otherwise. After the sealing material has solidified or hardened the envelope may be removed, as by cutting it away, or it may be left in place.

The manner of placing the envelope will, it is believed be understood. It may be pushed over a spigot end of a pipe until said end projects part way into its bell portion, said bell portion is then pushed over the bell of an adjacent pipe section until the gasket at the end of the spigot (which has meantime been put in place) is compressed against the shoulder of the pipe bell, the gaskets of the forms shown assisting in centering the spigot in the bell. The envelope is adjusted with respect to the bell so that its bell portion 8 closely embraces and surrounds said bell. In pushing the parts into place the shoulder portion 10 of the envelope will tend to assume a more rectangular or vertical position with respect to the pipe, owing to the friction between the envelope and pipe sections, thus tending to cause the envelope to constrict and embrace the pipe sections more tightly.

If desired a gasket 20, such as shown in Fig. 8, may be used to seal the mouth of the bell and close the sealing space, and this gasket, being of a tapered or triangular form in cross section is readily forced into position to make a close packing. An opening 21 may be made through said gasket to admit the sealing material. Such gasket may be used either with or without the envelope or sleeve.

It will be apparent that my invention provides an efficient means for readily making sealed pipe joints. The envelope or sleeve encloses the joint and the parts about it, effectively preventing the entrance of soil or earth either to the interior of the pipe, or to the sealing space, keeping the latter free from foreign matter that would tend to cause a defect in the seal. At the same time the spigot is centered in the bell, and the pipe sections are supported and held in axial alinement without danger of shifting or getting out of place while the joint is being sealed and the sealing material is setting or hardening. It will be understood that the sealing material is of a character suited to the material of the pipe and is fluid, or viscous, so that it will flow around the sealing space, and will harden and set. Various kinds of sealing material may be used, such as cement, or bituminous composition, tar, pitch, or other compositions, or molten metal, such as lead or alloy, which may be poured or pumped into the envelope through the gate opening therein.

Various changes or modifications of the forms shown herein may be made without departing from the principles of my invention.

I claim—

1. A device of the character described comprising an envelope or sleeve having two portions of respectively less and greater diameters, the portion of greater diameter adapted to closely embrace the bell of a pipe section and the portion of less diameter adapted to closely embrace the spigot end of a pipe inserted in said bell, said sleeve having an opening for the introduction of sealing material, and a deflecting guide for the sealing material adjacent said opening.

2. A device of the character described comprising an envelope or sleeve adapted to closely embrace and surround both the spigot and bell ends of adjacent pipe sections placed for jointing, a weakened area in said envelope for deflecting a portion thereof inwardly to form an opening therein, the deflected portion forming a deflector or guide for the sealing material introduced through said opening.

3. A device of the character described comprising an elastic envelope or sleeve formed to closely embrace and surround both the spigot and bell ends of adjacent pipe sections placed for jointing, said envelope adapted to form with the bell of the pipe an inclosed sealed space around said spigot for the reception of sealing material, the material of said envelope being preferable to form an opening for the introduction of sealing material, and a second opening adjacent the first for inspection and venting of air or vapor from said sealing space.

4. A device of the character described comprising a sleeve or envelope substantially cylindrical in form, one end portion of said sleeve of larger diameter to closely embrace the bell end of a pipe section, the other end portion of said sleeve of smaller diameter to closely embrace the spigot end of a pipe section placed for jointing in said bell, an intermediate shoulder portion of said sleeve continuous with and uniting said end portions, said end portions tapering respectively outwardly as and for the purpose described, means in the portion of the envelope adjacent the bell for forming an opening therein for admitting sealing material, and means for forming an adjacent opening for inspection and vent.

5. A device for forming pipe joints comprising a sleeve or envelope having one end portion formed to closely embrace and surround the mouth of the bell end of a pipe section, the other end portion of said sleeve of less diameter and coaxial with the first end portion, the end portion of less diameter forming an alining and centering support for the spigot end of a pipe section to be jointed in said bell of the adjacent pipe section, and means for forming pouring and vent or inspection openings in said sleeve for the joint sealing material.

6. Means for making and sealing pipe joints, said means comprising the combination with the bell and spigot ends of adjacent pipe sections of an envelope or sleeve closely embracing and surrounding both said ends of the pipe sections, a gate or opening for introducing fluid sealing material to the interior of said sleeve and between the said spigot and bell, a deflector adjacent said gate for deflecting the sealing material in one circumferential direction around said spigot end, and a second opening in said sleeve for inspection and vent.

7. Means for making and sealing pipe joints comprising the combination with the bell and spigot ends of adjacent pipe sections of a compressible packing gasket on the end of the spigot between the same and the shoulder of the bell, supporting and alining means for said spigot consisting of a sleeve or envelope closely embracing and surrounding the bell of the pipe section and having a reduced portion in which the spigot end of the pipe section is supported in alinement with the adjacent pipe section, said reduced sleeve portion closely embracing and surrounding said spigot end and closing the sealing space between the same and said bell, a gate in said envelope for the introduction of sealing material into said sealing space, a deflector for the sealing material leading inwardly from said gate, and a vent and inspection opening in proximity to said gate.

8. Means for making and sealing pipe joints comprising the combination with the bell and spigot ends of adjacent pipe sections of a compressible packing gasket secured to the end of said spigot over the surfaces of the same that contact with the interior of the bell, an elastic sleeve or envelope surrounding both said spigot and bell ends of the pipe sections and forming tight joints therewith, said envelope supporting said pipe sections in alinement, said envelope having weakened areas therein adjacent the mouth of the bell, one of said weakened areas adapted to be pushed inwardly to form a pouring opening for the sealing material with a deflector or guide for circumferentially directing said sealing material, and the other of said areas removable for forming a vent and inspection opening.

9. A device for forming pipe joints consisting of a sleeve or envelope of paper or like material formed and adapted to closely embrace and surround both the spigot and bell ends of adjacent pipe sections, said envelope having an intermediate portion for closing the sealing space between said pipe sections adjacent the mouth of the bell, a portion of said envelope forming both a gate opening therein and an adjacent deflecting tongue, and a portion of said envelope removable to form a sight opening.

10. Means for forming pipe joints comprising the combination with adjacent bell and spigot ends of pipe sections, of a gasket at the end of said spigot, means on said gasket to retain said gasket on the spigot, said means also forming a centering device for the end of the spigot in the bell, and an envelope surrounding both said spigot and bell and closing the sealing space therebetween.

MARTIN P. DEMING.